United States Patent [19]

Knapp

[11] 3,866,587
[45] Feb. 18, 1975

[54] AUTOMOTIVE FUEL HEATING CONTROL SYSTEM

[75] Inventor: Heinrich Knapp, Leonberg-Silberberg, Germany

[73] Assignee: Robert Bosch GmbH, Gerlingen-Schillerhohe, Germany

[22] Filed: Apr. 2, 1973

[21] Appl. No.: 346,756

[30] Foreign Application Priority Data
May 17, 1972 Germany............................ 2224005

[52] U.S. Cl............. 123/122 F, 219/207, 219/499, 219/501
[51] Int. Cl.......................................... F02m 31/00
[58] Field of Search......... 123/122 E, 122 F, 122 H, 123/122 R; 219/205, 206, 207, 499, 501

[56] References Cited
UNITED STATES PATENTS

| | | | |
|---|---|---|---|
| 2,346,506 | 4/1944 | Pulliam | 219/205 |
| 3,626,917 | 12/1971 | Tromel et al. | 123/122 R |
| 3,708,652 | 1/1973 | Salway-Waller | 219/499 X |
| 3,735,092 | 5/1973 | Traister | 219/501 |

*Primary Examiner*—J. V. Truhe
*Assistant Examiner*—N. D. Herkamp
*Attorney, Agent, or Firm*—Flynn & Frishauf

[57] ABSTRACT

To provide for predetermined heating of fuel applied to an automotive internal combustion engine, in spite of widely varying supply voltages, a heating resistance is connected, together with a reference resistance, in a bridge circuit which is connected across the power supply; the measuring diagonal of the bridge is connected to an operational amplifier, the output of which controls a variable resistance, such as a transistor, connected in series with the heating resistance to maintain current flow through the heating resistance at a uniform level.

10 Claims, 1 Drawing Figure

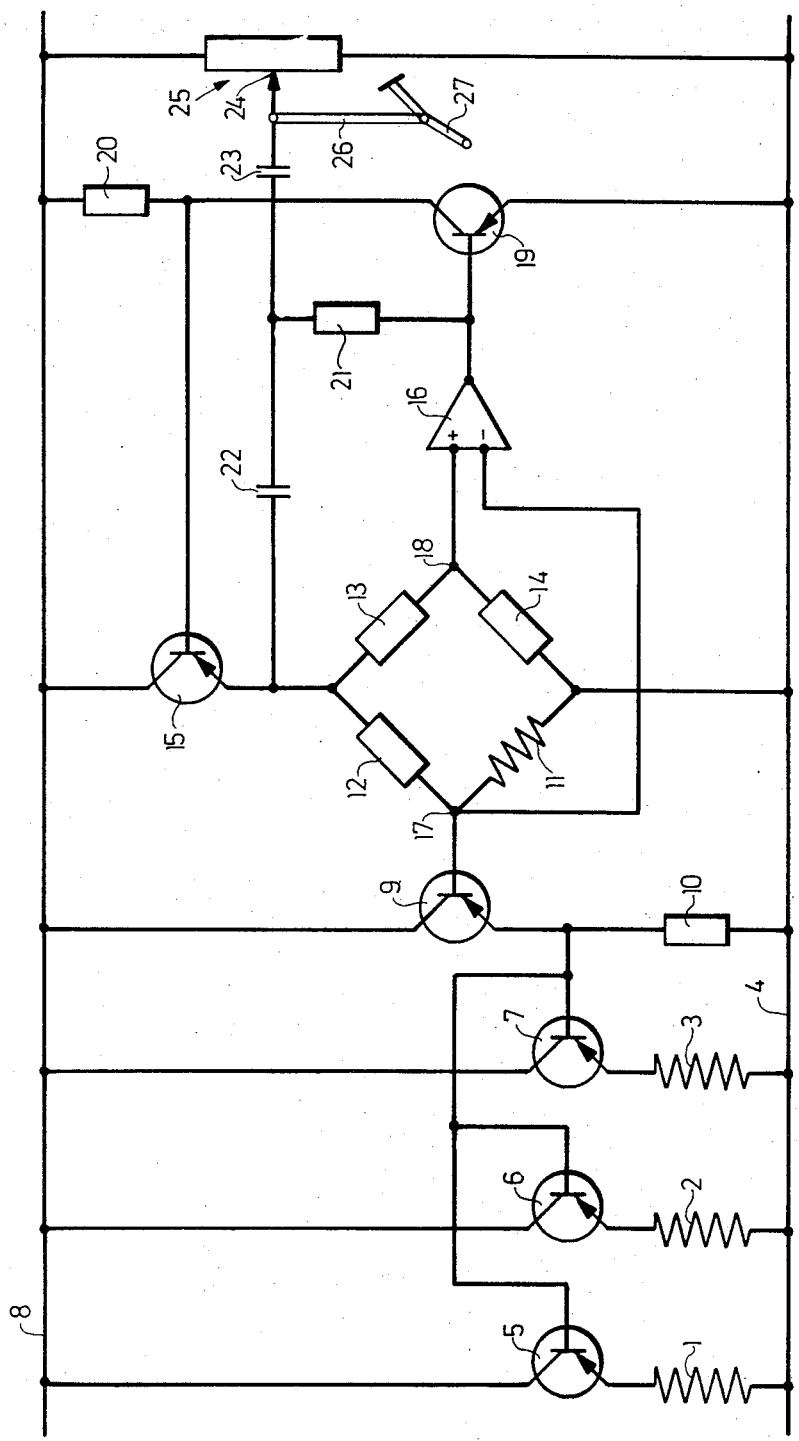

AUTOMOTIVE FUEL HEATING CONTROL SYSTEM

The present invention relates to a system to control heating of fuel being applied to internal combustion engines and more particularly to such a system for use with automotive engines, where the supply voltages varies widely.

When starting cold internal combustion engines, it is desirable to heat the fuel before applying the fuel to the engine itself. The warm-up phase of the engine is thus important, thereby decreasing inefficient operation of the engine and resultant air pollution. The fuel which is applied to the internal combustion engine must be maintained at a certain predetermined temperature which should be neither too hot, nor too cold. If the temperature is too high, the fuel may crack; if too cold, it may not vaporize properly. Particularly when the application of fuel to the engine utilizes a fuel injection system, the fuel may not vaporize or atomize effectively if it is excessively cold. It has therefore been proposed to utilize heaters, typically electric heating elements supplied from the battery or electrical system of the internal combustion engine, in order to heat the fuel to a desired temperature. These heaters are typically located in advance of the atomization point of the fuel, for example in advance of the injection nozzle of the fuel into the combustion space of the internal combustion engine.

Heating systems for fuel, to be injected into internal combustion engines must be controlled to provide for effectively constant temperature of the fuel being applied to the engine. The mass flow of the fuel through a fuel injection system may control the flow within wide limits, for example within a ratio of 1:30, depending on operating conditions and operating parameters of the internal combustion engine. At high flow rates, the fuel usually atomizes well due to the high flow velocity as the fuel passes through the injection valves or inlet valves of the internal combustion engine. The control of temperature of the fuel is thus necessary to be effective with respect to flow rates of the fuel only between about idling fuel requirements and ten times the idle fuel requirements. Beyond that, uniform heating of fuel applied is not necessary.

The control system to control the heater for the fuel must be capable of providing effectively uniformly heating power to the fuel which flows thereabout, although the voltages available from automotive-type batteries used with automotive internal combustion engines vary widely. During starting of automotive-type internal combustion engines, the voltage tends to drop substantially due to high starter current requirements. Thus, heating resistors connected directly to the power bus or line of the vehicle are heated less due to the lower operating voltage. Upon starting of the engine, however, the voltage at the power lines of the vehicle jumps rapidly. If, upon starting, a lesser amount of fuel is applied as soon as the engine has started, precautions must be taken in order to prevent burn-out of the heating elements; the danger of burn-out of the heating elements is particularly acute if fuel flow should be entirely interrupted.

It is an object of the present invention to provide a control system for heaters for fuel to be applied to automotive-type internal combustion engines which meet the stringent operating requirements, is protected against burn-out in case of failure of fuel flow, and is automatically controllable to provide essentially uniform heating power in spite of wide variations of supply line voltage.

Transient conditions are particularly frequent in the operation of automotive-type internal combustion engines. Such transients arise, for example, upon acceleration, and particularly upon rapid, high rate acceleration, during which, for a short period of time, a substantial excess of fuel may flow to the engine, typically a fuel injection system. Intensive heating should thus occur immediately; fuel injection systems may be subject to vapor lock, that is, a vapor cloud may arise in the injection system which causes some delay in response, the escaping vapor additionally tending to condense due to the pressure rise resulting from the transition to vapor state.

It is an additional object of the present invention to provide, in a preferred form, a means to effect rapid response of the heating control system to changing engine operating conditions.

SUBJECT MATTER OF THE PRESENT INVENTION

Briefly, a heating resistor is serially connected with a reference resistor to form, together therewith, a branch of a bridge circuit. The second branch of the bridge circuit is formed by a pair of connecting resistors. The diagonal of the bridge, taken from the junction between the reference resistor and the heating resistor is connected to an operational amplifier which controls change of the supply voltage to the bridge circuit. The heating resistor is exposed to the fuel to be heated.

The system in accordance with the present invention can be used to control not only a single heating element, but a plurality of heating elements, one for each one of a fuel injection system, or a fuel atomizing device. Only a single one of the control systems is necessary, thus saving on components, to control the heating effort of a plurality of heating windings; if this form of the system is used, the temperature of fuel flow to only a single atomizing or injection device is sensed. This is a simplified system which is entirely adequate for most applications since, particularly in fuel injection systems, very little temperature differences arise between the fuel components applied to the various cylinders.

The invention will be described by way of example with reference to the accompanying single FIGURE which shows a schematic circuit diagram of the control system, applied to an internal combustion engine.

Three heating elements 1, 2, 3, each one located to heat fuel being applied to an injection nozzle of a fuel injection system, are separately connected across supply buses 4, 8, connected to a battery of an automotive vehicle. The heating elements 1, 2, 3 are connected in series with the collector-emitter paths of respective transistors 5, 6, 7. The bases of transistors 5, 6, 7 are connected in parallel to a common line and connected in turn to the control electrode of a transistor 9, in this case between the emitter and an emitter resistor 10 which is connected to bus 4. The collector of transistor 9 is connected to the other supply line 8. The base of transistor 9 is connected to junction point 17 which forms the common junction between a further heating element 11 functioning, additionally, as a heat sensing element, likewise located in the flow of fuel to supply a further atomizing or fuel injection system, and a reference resistor 12. The heating element 11 and the reference resistor 12 form one branch of a bridge circuit, the other branch of which is formed by two fixed resistors 13, 14. The remote terminals of the heating element 11 and resistor 14 are connected to one supply line 4. The remote terminal of the reference resistor 12 and the other bridge resistor 13 is connected through the emitter-collector path of a transistor 15 to the other supply line 8. The diagonal of the bridge, formed by junctions 17, 18 is connected to the two inputs of an operational amplifier 16. Junction 17 is connected to the inverting input, junction 18 to the non-inverting input of the operational amplifier 16. The output of the operational amplifier 16 is connected to the base terminal of a transistor 19, the collector-emitter path of which is serially connected through a resistor 20 between the supply buses 4, 8. The collector of transistor 19 is connected to the base of the transistor 15. The output of the operational amplifier 16 additionally is connected to a resistor 21, which is connected through a capacitor 22 to the emitter of transistor 15 and hence to one of the terminal points of the bridge. Resistor 21 and capacitor 22 form an R/C circuit in the feedback path of the operational amplifier 16.

Resistor 21 further is connected to one electrode of a capacitor 23, the other electrode of which is connected to the tap point or slider 24 of a potentiometer 25 which is connected across the supply buses 4, 8. The position of the potentiometer slider 24 is controlled over a link 26 by the accelerator control or accelerator pedal 27 of the internal combustion engine which is not shown in the drawing. The position of the slider 24 on the potentiometer 25 will depend on the position of the accelerator 27, 27. which, as usual, is connected to the throttle of the internal combustion engine.

When designing the circuit, the bridge should be constructed to be highly unsymmetrical. Heating element 11 may, for example, have a normal resistance of 0.5 Ω; the reference resistor 12 then may have a value ten times smaller, for example 0.05 Ω, so that the loss in power in the resistor 12 is small with respect to the heating power supplied by resistor 11. The relative values of the circuit should further be so arranged that the heating elments 1, 2, 3, 11 will reach appropriate heating temperature even if the voltage between buses 4, 8 drops to less than about 75 percent of nominal voltage, for example to about 8 volts, with 12 volts nominal, at least if the mass flow of fuel past the resistors 1, 2, 3, 11 is not high. Thus, upon starting, sufficient heat will be supplied by the heating elements to pre-heat fuel applied to the engine. If the voltage then rises to a higher value, for example to 13 V, after the engine has started, a sufficient reserve for heating of the fuel will be available, so that the higher fuel flow to be expected upon loading of the engine can be adequately heated. Further complete heating to nominal temperature may be required only up to about half of maximum flow of fuel to the atomizing, or fuel injection device. The requirements of pre-heating of fuel decrease, as the fuel flow increases, since the increased air velocity, or inlet manifold vacuum in the inlet system to the internal combustion engine contributes to proper atomization of fuel in the fuel-air mixture.

Operation: Upon temperature change of the fuel to be injected, the resistance of resistor 11 changes. This unbalances the bridge. The unbalance is sensed by operational amplifier 16 which will provide an output signal, depending in amount and sign on the deviation, or unbalance of the bridge. This output signal is amplified in transistor 19 and applied to the base of transistor 15, changing the conductivity of transistor 15 which changes the voltage being applied to heating resistor element 11. Let it be assumed that the temperature of the fuel to be injected drops. This decreases the resistance of element 11, and changes the output signal of the operational amplifier in the direction of supply bus 4. This causes increased conductivity of transistor 19, which, in turn, causes a drop of voltage at the base of transistor 15 which increases the voltage at the emitter of transistor 15 so that the overall supply voltage to the bridge circuit is increased. Upon increase of the supply voltage to the bridge, the voltage at junction 17 between the reference resistor 12 and the heating resistor 11 will rise, thus increasing the heating power being supplied by the heating element 11.

Transistor 9, the base of which is connected to junction 17 and hence to a voltage which changes to maintain the resistance of resistor 11 constant, then controls the conductance of transistors 5, 6, 7 to control current flow through windings 1, 2, 3. The heating power supplied by windings 1, 2, 3 likewise will increase if additional voltage is supplied at junction 17. Higher current flow through heating elements 1, 2, 3, 11 causes increased heating of fuel to be injected.

Changes in heating at the heating element 11 are subject to some inertia and delay. These changes may lead to instability in the control system. The R/C circuit 21, 22 in the feedback circuit of the operational amplifier 16 prevent oscillations within the control loop.

Sudden changes in operating conditions of the engine are transmitted from slider 24 of potentiometer 25, over capacitor 23. The controller thus will be responsive to changes in operating conditions, thus will have the effect of a differential controller under transient conditions. The temperature of fuel to be injected should be rapidly controlled upon sudden acceleration of the internal combustion engine. The differentiating network formed of potentiometer 25 and capacitor 23 transmits electric representation of rapid change in the position of accelerator pedal 27. The rapid change in voltage on tap point or slider 24 is transmitted over capacitor 23 and rapidly, but briefly, changes the supply voltage until the capacitor 23 is charged to a new level. The circuit in accordance with the present invention effectively prevents burn-out of the heating elements 1, 2, 3, 11. Upon low fuel flow, or complete interruption of supply of fuel to the internal combustion engine, for example to a fuel injection system, or to a carburetor inlet, the heating elements will reach a high temperature. Specifically, heating element 11 will become hot, so that its resistance increases. This unbalances the bridge in the other direction, and operational amplifier 16 will provide a control signal to transistors 19, 15 in the direction opposite to that when the temperature of resistor 11 drops, so that the transistor 15 will decrease its conductance and the voltage at junction 17 supplying heater element 12 will drop. Dropping voltage at junction 17 causes transistor 9 to become highly conductive, and the bases of transistors 5, 6, 7 will have a positive voltage applied thereto so that the transistors 5, 6, 7 will block, entirely interrupting heating current through heaters 1, 2, 3, and, if transistor 15 is blocked, also interrupting current through resistor 11.

A plurality of heating elements similar to heating elements 1, 2, 3, can be controlled by sensing fuel flow passing over a single heating element 11. Ordinarily, the temperature of the fuel applied to various inlet points of an internal combustion engine does not vary by large amounts, so that one single bridge circuit can be used to control a plurality of heating elements. If sign control is desired, then the circuit to the left of junction 17 can be omitted and each separate heating element can be controlled with its own control circuit. Only a single potentiometer 25 is needed, and a single capacitor 23, properly dimensioned, is sufficient.

Various changes and modifications may be made within the inventive concept.

I claim:

1. Automotive fuel heating control system, to control the heating effort of heating resistors (1, 2, 3, 11) located in the path of fuel flow to the internal combustion engine, comprising
    at least one heating and heat sensing resistor (11) exposed to the fuel to be heated;
    a reference resistance element (12);
    an operational amplifier (16);
    and two connecting resistors (13, 14), the reference resistance and the heating resistor being connected in one branch of a bridge circuit, the connecting resistors forming the other branch thereof, the operational amplifier being connected to the diagonal formed by the common junction of the reference resistance (12) and the heating and sensing resistor element (11) to sense unbalance of the bridge and to provide a resulting output signal;
    means (4, 8) providing a supply voltage;
    and means (15, 19) connected to and responsive to the output signal of the operational amplifier (16) to control the voltage being supplied from the voltage supply means to the bridge circuit, and hence the voltage applied to the heating and sensing resistor element (11).

2. System according to claim 1, wherein the internal combustion engine has a throttle control;
    the system further comprises a differentiating network (23, 25) connected to sense change in position of the throttle control and providing an output signal to the voltage supply control means (15, 19) to modify the control effect thereof and provide rapid increase in supply voltage to the heating and sensing resistor element (11) upon sudden change in throttle position in direction of opening of the throttle.

3. System according to claim 2, wherein the differentiating network comprises a capacitor (23) and a potentiometer (25) having its slider electrically connected to the capacitor and its terminals connected across the supply voltage source, and its slider mechanically connected to the throttle control of the internal combustion engine.

4. System according to claim 1, wherein the voltage supply control means connected to the output of the operational amplifier (16) comprises
    an amplifier (15, 19).

5. System according to claim 4, wherein the amplifier comprises
    a first transistor (19) having its control electrode connected to the output of the operational amplifier (16);
    and a second transistor (15) having its control electrode connected to the output electrode of the first transistor, the second transistor having its emitter-collector path connected in series between the heating and sensing resistor element (11) in the bridge circuit and the source of supply voltage (4, 8).

6. System according to claim 1, further comprising an R/C network (21, 22) in the feedback path of the operational amplifier.

7. System according to claim 1, further comprising means (9, 10) sensing the voltage being supplied to the bridge circuit and hence to the heating resistance, under control of said voltage supply control means;
    at least one additional heating resistor (1, 2, 3) and a current supply control means (5, 6, 7) in series with each respective resistor, the series circuits formed of the current supply control means and the heating resistor being connected across the voltage source;
    and a connection from said voltage sensing means (9, 10) to the control terminal of the current supply control means (5, 6, 7) to control current flow through said series connection and hence through the additional heating resistors (1, 2, 3).

8. System according to claim 7, wherein the current supply control means comprises a transistor (5, 6, 7), each, the bases of the transistor, or transistors being controlled by said sensing means.

9. System according to claim 7, wherein said sensing means comprises a transistor (9) having its base connected to the junction of the heating and sensing resistor element (11) and the reference resistance 12, and its emitter-collector path connected across the supply voltage, the sensed output being taken from one of said emitter or collector terminals.

10. System according to claim 9, wherein the emitter-collector path of the sensing means transistor (9) is connected to the supply voltage source through a resistor (10);
    the junction of the resistor and the respective transistor electrode being connected to the base, or bases, of the additional transistor, or transistors (5, 6, 7).

* * * * *